April 17, 1956

J. WINN 2,742,133

TRANSFER AND CONVEYING DEVICES

Filed Feb. 20, 1950

INVENTOR.
John Winn
BY A. Feinberg
ATTORNEY

INVENTOR.
John Winn
BY A. Feinberg
ATTORNEY

April 17, 1956  J. WINN  2,742,133
TRANSFER AND CONVEYING DEVICES
Filed Feb. 20, 1950  3 Sheets-Sheet 3

INVENTOR.
John Winn
By Mason, Kolehmainen,
Rathburn & Wyss
Attorneys

United States Patent Office 2,742,133
Patented Apr. 17, 1956

2,742,133

TRANSFER AND CONVEYING DEVICES

John Winn, Stamford, Conn., assignor to Wynnwood Corp., Winnetka, Ill., a corporation of Illinois Application February 20, 1950, Serial No. 145,255

21 Claims. (Cl. 198—27)

This invention relates to transfer means, interposed between storage areas and transport means, associated with systems for selecting, discharging, collecting and conveying articles to an assembly point and more particularly those systems wherein the operation is remotely controlled.

In such systems heretofore used, articles are dispensed from storage areas and fall varying heights onto a belt which is usually moving. Fixed buffers are sometimes interposed to cushion the fall and guide the articles to the belt. The length of the belt is usually not less than the extent of the storage and dispensing means positioned along the belt, and this minimum length of belt must be cleared of all articles of one selected order before the first article of the next selected order may be released from storage, if each order is to arrive without overlap at the assembly point as is usually required. This belt clearance lost time reduces the effective carrying capacity of the belt and causes it to be a serious bottle neck in the order assembly system. The random order in which articles reach the conveyor belt and the necessary high speed used to minimize clearance time results in excessive breakage of articles.

A primary object of my invention is to provide a remotely controlled device that will collect articles of various descriptions and transport them to an assembly point with no interruption for belt clearance between orders and to do so in a manner which minimizes the possibility of impacts which might cause breakage.

In accordance with my invention there is produced a mechanical collecting, discharging, and conveying device that is electrically operated and remotely controlled. It operates at a safe rate of speed. It handles articles of varying size, shape, resilience and consistency. It conveys articles to an assembly point in a manner which minimizes impacts which might cause crushing, squashing or breakage of brittle, fragile and breakable articles. It employs complementary twin buffer and transfer troughs, one of which collects the articles of an entire order and then dumps to one of twin conveyor belts, immediately following which the other trough is ready to collect a second order and dump to the other belt at which time the first trough is again ready to receive the next order thus assuring continuity of action. The fall of articles from storage areas is cushioned by buffers which guide articles to the troughs. The simultaneous deposit on the conveyor from the trough of all the collected articles of one complete order practically eliminates inter-article impacts during transit on the belt, and permits predetermination of the order of arrival of the articles at the assembly point in accordance with the order of their pre-assigned location in the storage space. Heavy hard articles may be assigned to arrive first followed by light soft ones.

Further objects of my invention will hereinafter appear from the following description illustrative of the invention and shown in the accompanying drawings in which:

Fig. 1 is an end view of the supplementary 90 degree longitudinal transfer troughs;

Fig. 2 is a schematic of the electrical circuit controlling the above;

Figure 5:
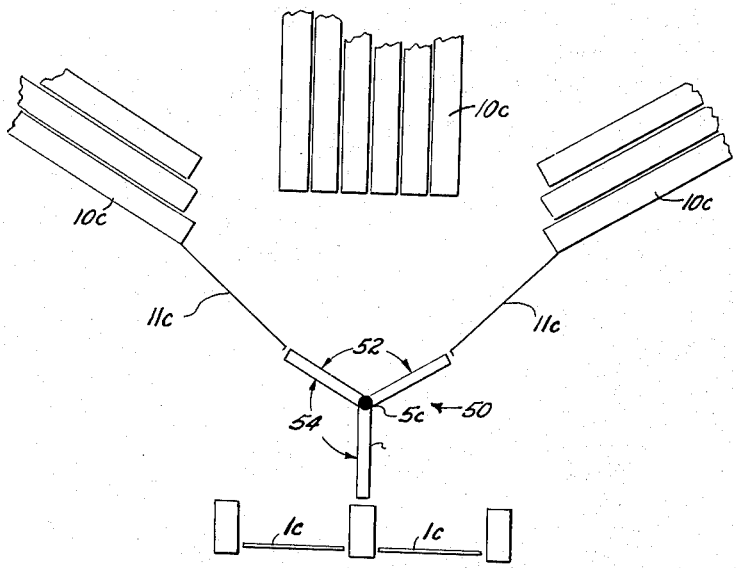
Fig. 5 is a diagrammatic cross sectional drawing of two longitudinal 120 degree V-shaped segmentary rotating transfer troughs.

The device consists of buffering, collecting, transferring and conveying means used in combination with a multiplicity of remotely controlled electrically operated dispensers. These dispensers are so positioned above the buffering and collecting means that articles released or ejected from any dispenser will fall in such a manner as to be guided by the buffering means to a position at rest within the collecting means. The collecting means is also the transferring means since in all cases it is so mounted and shaped that it can rotate in a vertical plane about a horizontal axis in a manner which will deposit the contained collected articles simultaneously and safely on either of twin conveyor belts running below and parallel to said collecting and transferring means, these belts being of conventional power drive type.

The twin conveyor belts run from the rear of the stock area substantially horizontally and forward to the assembly point which may be in the stock area or at a more remote point. The belts are parallel, of an appropriate width and the distance between them is determined by the dimensions and extent of rotary motion of the transfer means which in all cases is mounted above, parallel to and midway between the twin belts.

The transfer means may consist of two supplementary 90 degree longitudinal troughs which oscillate through a 90 degree arc about an axis located at the contiguous apexes. In certain instances the two V-shaped segmentary transfer troughs may each have an angular opening of 120 degrees in which case the oscillating rotation about the common axis is 120 degrees, or with 180 degree openings the troughs are either side of a double faced rotating tipple plate or trap which from a horizontal position is rotated 180 degrees in alternate directions and associated with a synchronized oscillating guide plate hinged along its lower edge and rotating about 90 degrees in the opposite direction. For certain types of merchandise either the rotating tipple plate or the oscillating guide plate operating individually may suffice as a transfer device between the dispensers and the conveyor belts. In any case supplementary fixed buffer guides are placed as may be necessary to cushion and confine the motion of the articles travelling from the storage area to the assembly point. An electrical control circuit times, controls and operates the various moving members of the various dispensing and transferring devices.

The stock of articles for selection and dispensing is in place in the dispensing chutes or cabinets of appropriate types which may be positioned in any manner above, along and over the trough which is the collecting means. When ready to receive an order, one of the twin troughs is empty and has its opening facing vertically. As articles are selected, they are released or ejected from the dispensers, fall and settle into the upturned trough below, being cushioned and guided by fixed buffer guides and the buffer sides of the trough itself. When all articles of a given order are selected and are settled in and along the trough the electrical control will cause rotation of the twin troughs in an amount appropriate to the type of trough resulting in the transfer by gravity of all the articles simultaneously to one of the twin conveyor belts. The rotation of the twin troughs brings the second trough fully into the collecting position coincidentally with the arrival of the first trough at the full discharging position. Selection of the second order may be started immediately and when all articles are settled in the collecting trough, reverse rotation of the twin troughs will discharge the second order to the second twin belt and bring the first twin trough back into place ready to receive the articles of a third order.

Referring to the drawings, in Fig. 1, a twin transfer trough and belt assembly is shown in detail. The conveyor belts 1 (Figs. 1 and 6) are supported on rollers 2 mounted on framework 3. This framework also supports the twin troughs 4 which revolve about the axis of shaft 5 which is mounted in bearings not shown. The troughs 4 can revolve clockwise in a 90 degree arc from the position shown, with trough 4a in place to receive a deposit, to a position which dumps segment 4a and brings segment 4b into position to receive a deposit. The trough 4 can then revolve counter-clockwise to dump segment 4b onto the other conveyor belt and bring segment 4a back into the receiving position. The trough is rotated by a reversible drive motor 6 through gears 7. The drive motor 6 is stopped when one of the two lugs 8 operates one of the two switches 9a or 9b. The position of chutes 10 in relation to the transfer troughs is indicated. Fixed buffers 11 are used as may be necessary so that falling articles released from chutes 10 may first strike a buffer 11 or high on the side of the trough 4 and not fall directly on articles already in the trough 4. In actual operation all the dispensed articles are retained in the transfer trough, which is up until the full order is dispensed when the transfer control circuit causes the start of the drive motor 6. In about one second the other transfer trough is ready to receive the articles of the following order. Hence there is no delay between orders as is necessary in a system using the usual fixed baffles and a single belt. In this improved twin system after one order has been dumped on one belt there is available time for belt clearance while a second order is accumulating in the transfer trough, plus one second while the second order is dumped to the second belt, plus the time it takes to accumulate the third order which will be dumped on the first belt. Even in the case of very small orders there is sufficient time for clearance at moderate belt speed.

In Fig. 2, the elements of the transfer control circuit and their interconnections are shown, with trough 4b in the dumping position. Its lug 8 has operated switch 9b and is holding switch 9b closed. Switch 9a is in the open position being held there by spring 15. The corresponding spring 15 of switch 9b is compressed by lug 8 and is ready to open switch 9b when pressure is removed. Micro-switch 16 has its operating arm 17 in the "off" position. The switch 16 receives current from a source 18 and has leads 19 to the reversible motor 6. The switch 16 is designed to alternate the direction of rotation of reversible drive motor 6 with successive "ons." When in the "off" position the operating arm 17 of switch 16 can be pulled to the "on" position by electromagnet 20. When the operating arm 17 is in the "on" position it can be pulled to the "off" position by electromagnet 21. The relay 22 is of the slow operating type and is shown in the non-operated position with contact 23 made. When relay 22 is operated contact 23 is broken and contact 24 is made. The relay 25 is the "end of the list" relay and is operated when all of the articles have been dispensed onto the collecting or transfer means such as the trough 4. When relay 25 is non-operated contact 26 is broken. When relay 25 is operated contact 26 is made. The switches 9a and 9b, electromagnets 20 and 21 and relays 22 and 25 are interconnected by wires 27. There are ground connections 28 and a battery supply 29. When the end of the list has been reached and all articles have been dispensed into trough 4a, a contact is made which causes relay 25 to operate. This closes contact 26 and permits current to flow from battery 29 over wires 27, through the winding of electromagnet 20, the circuit being completed through wire 27 and contact 23 to ground 28. Current also flows from battery 29 through contact 26, wires 27, the winding of relay 22 and back to ground 28. Since relay 22 is of the slow operating type, contact 23 remains made long enough for electromagnet 20 to pull operating arm 17 to the "on" position. This starts drive motor 6 which starts to revolve troughs 4 in the clockwise direction. When troughs 4 have rotated a slight amount, lug 8 has removed pressure from spring 15 and switch 9b is opened. Switch 9a is still open. The slow operating relay 22 is so timed that it operates shortly after switch 9b opens. Operation of relay 22 breaks contact 23 and makes contact 24. This breaks the circuit and stops the flow of current through the winding of electromagnet 20. The operating arm 17 remains in the "on" position until continued clockwise rotation of troughs 4 advances lug 8 to the point where it operates and closes switch 9a. Closing switch 9a completes a circuit from battery 29 through wires 27, the winding of electromagnet 21, switch 9a, contact 24 and back to ground 28. This current flow causes electromagnet 21 to pull the operating arm to the "off" position which stops the drive motor 6, instantly, thus stopping rotation of troughs 4. The operations described up to this point have taken about one second. At the end of about one second more relay 25 will release, as a result of the predetermined operation of the control circuit, and contact 26 will be broken. This will stop the flow of current through electromagnet 21 and relay 22. Release of relay 22 will break contact 24 and make contact 23. This leaves the trough circuit as it was at the start except that switch 9a is operated instead of switch 9b. These two switches 9a and 9b are in parallel.

The clockwise rotation of troughs 4 causes the articles which were in trough 4a to be dumped to the right hand belt 1 and causes trough 4b to come into position to receive the next order.

Figure 3:
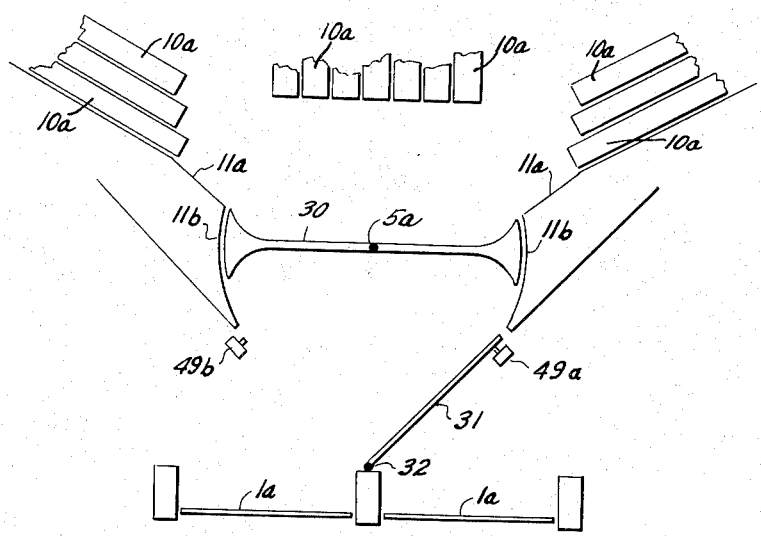
Fig. 3 is a diagrammatic end view of a symmetrical double faced rotating tipple plate with synchronized oscillating guide plate.
Figure 4:
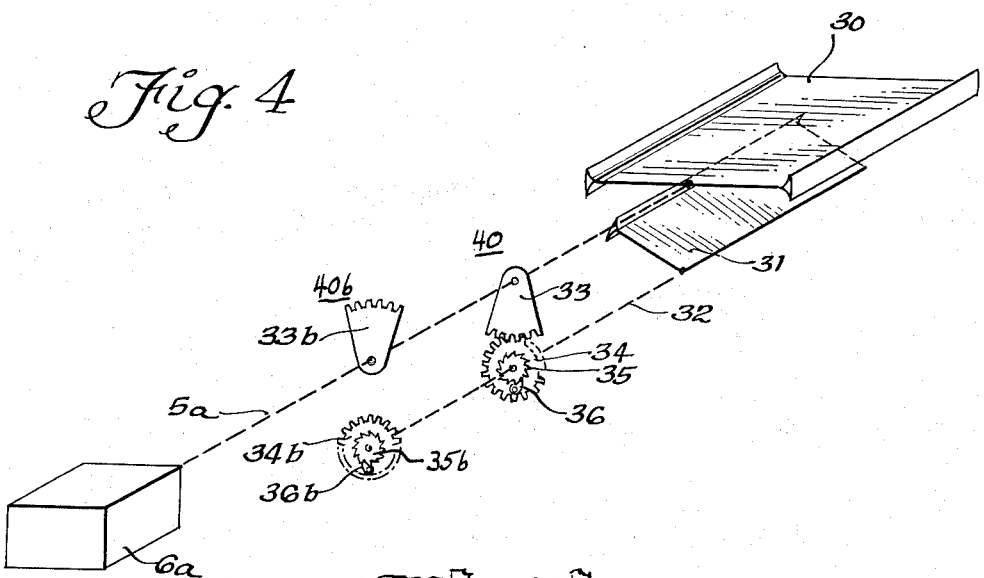
Fig. 4 is a diagrammatic perspective view of a mechanism for correlating relative movements of the tipple plate and the guide plate shown in Fig. 3.
Figure 6:
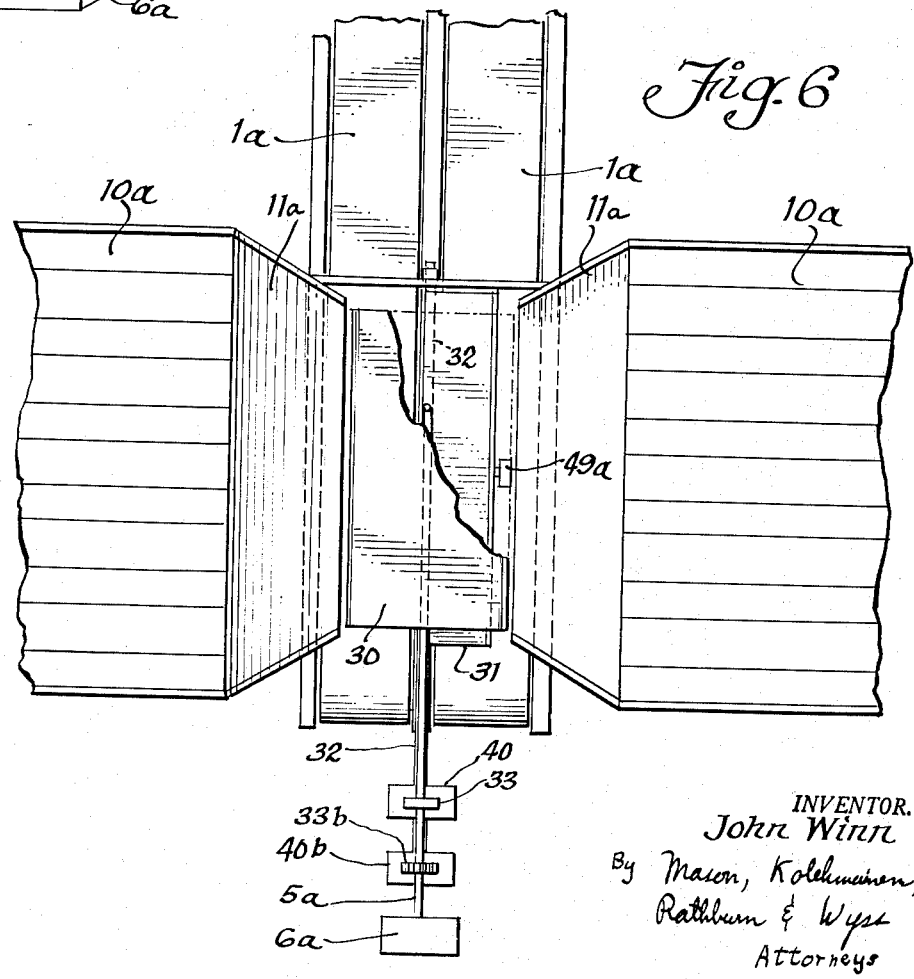
Fig. 6 is a top plan view of the apparatus shown in Fig. 3 with the vertical dispensing chutes removed and showing the relative positions of the dispensing devices, transferring means and the conveying means.

Referring to Figs. 3, 4 and 6 wherein the elements similar to those disclosed in Figs. 1 and 2 are denoted by like reference numerals followed by the suffix "a," there is shown, another embodiment of my invention for providing positive action in the dumping of articles offering high resistance to sliding on a 45 degree slope. Vertical overhead and side inclined plane storage receptacles and chutes 10a, electrically released and gravity operated, for dispensing articles by remote control onto a 180 degree trough comprising a symmetrical double faced rotating tipple plate 30 associated with a synchronized oscillating guide plate 31, pivoted along its lower edge by a shaft 32 and twin longitudinal belts 1a positioned one on each side of guide plate 31. The belts 1a are located below guide plate 31 and parallel to the shaft 32. The two fixed sloping buffers 11a, of resilient surface form a hopper to funnel the dropping and sliding articles onto the tipple plate 30. The swinging guide plate 31 serves to route the articles to one or the other of the conveyor belts. The lower hopper sides 11b follow the arc of rotation of the outer edges of the tipple so that when the tipple revolves, articles are kept from sliding off before the guide plate is reached. When the guide plate 31 is in its right hand position as shown, rotation of the tipple 30 is clockwise to dump and articles are routed to the left hand belt 1a and when the guide plate 31 is in its left hand position rotation of the tipple 30 is anticlockwise to dump and articles are routed to right hand belt. The guide plate 31 starts to rotate after tipple 30 has passed the vertical position and its motion is so timed that it will complete its swing at the same instant that the tipple completes its swing and comes to rest in the horizontal position.

Fig. 4 shows a device for synchronizing the movement of the plate 30 with the guide plate 31 so that the articles collected on the plate 30 are alternately discharged onto different ones of the conveyors 1a. More particularly, a driving assembly 40 is provided for rotating the guide plate in a counterclockwise direction. This assembly includes a segmental gear 33 which is secured to the shaft 5a. When, in response to the operation of the relay 25, the article receiving plate 30 is rotated in a clockwise direction to discharge the articles collected thereon onto the conveyor 1a, shown at the left in Fig. 3 of the drawings, the teeth on the segmental gear 33 are moved into engagement with the teeth on a gear 34 rotatably mounted on the shaft 32 following approximately one hundred thirty-five degrees of clockwise rotation. At this time the plate 30 has been rotated through a vertical position so that all of the articles collected on the plate 30 have been discharged to the conveying means.

The engagement of the segmental gear 33 and the gear 34 followed by continuing rotation of the shaft 5a produces counterclockwise rotation of the gear 34. A pawl 36 is pivotally mounted on the gear 34 to engage the teeth of a ratchet 35 which is secured to the shaft 32. Therefore, counterclockwise rotation of the gear 34 produces counterclockwise deflection of the guide plate 31 to move this plate from the position shown in Fig. 3 to that shown in Fig. 4 in which it is effective to direct articles discharged from the plate 30 onto the conveying means 1a shown at the right in Fig. 3. When the guide plate 31 reaches the counterclockwise position shown in Fig. 4, a switch 49b, identical with the switch 9b shown in Fig. 2, is engaged and operated to remove the energization from the driving means 6a and, accordingly, to retain the plates 30 and 31 in a proper position for receiving and deflecting the next group of selected articles.

When the next group of articles is to be dispensed, the relay 25 is operated to produce counterclockwise rotation of the shaft 5a and plate 30. The initial portion of this counterclockwise rotation produces clockwise rotation of the gear 34. However, this clockwise rotation of the gear 34 is not transmitted to the shaft 32 inasmuch as the pawl 36 rides idly over the teeth of the ratchet 35. After the plate 30 has been rotated through approximately one hundred thirty-five degrees, during which interval of rotation the articles collected thereon are discharged onto the conveying means 1a shown at the right in Fig. 3, a driving assembly 40b similar to but reversed in position from the assembly 40 is rendered effective to produce clockwise rotation of the guide plate 31 to return this plate to the position shown in Fig. 3.

In addition to a segmental gear 33b, the driving assembly 40b includes a gear 34b, a ratchet 35b, and a pawl 36b. These elements are reversed in position from those forming the driving assembly 40 so that only clockwise rotation of the shaft 32 is produced by the assembly 40b. When the guide plate 31 is returned to its clockwise position (Fig. 3), a switch 49a identical to the switch 9a disclosed in Fig. 2 of the drawings, is engaged and operated to terminate operation of the driving means 6a.

Fig. 5 of the drawings discloses another embodiment of my invention in which elements similar to those disclosed in Figs. 1 and 2 of the drawings are denoted by like reference numerals followed by the suffix "c." This embodiment includes both vertical overhead and inclined side storage receptacles and chutes 10c having electrically controlled and gravity operated doors for dispensing articles by remote control onto a trough 50 consisting of two longitudinal one hundred twenty degree V-shaped troughs 52 and 54. The trough 50 is alternately rotated in one hundred twenty degree steps around an axis formed by a shaft 5c in opposite directions so as to alternately discharge the collected articles onto a pair of conveying means 1c. In this embodiment of the invention, the lowermost side wall of each of the troughs 52 and 54, when these troughs are moved into an article discharging position, becomes substantially vertical so as to insure the discharge of the articles. This modification is desirable when the forty-five degree discharging slope of the lowermost wall of the troughs 4a and 4b shown in Fig. 1 is not sufficient to produce a complete discharge of the collected articles.

While the preferred embodiments of my invention have been described in detail, it will be understood that I do not wish to be limited to the particular construction shown and set forth, since various changes in the form, proportions and arrangement of parts and in the details of construction may be resorted to without departing from the spirit and scope of the invention, or destroying any of the advantages contained in the same heretofore described and defined in the subjoined claims.

I claim:

1. A twin buffer-to-belt transfer device comprising article dispensing means, a mechanically movable transfer means and twin longitudinal conveying means, said transfer means comprising a movable buffer positioned below and adjacent to said article dispensing means and above and adjacent to said conveying means, said conveying means being parallel to said buffer, said buffer consisting of associated longitudinal tipple plates and longitudinal guide plates, and means including an electric circuit controlling the cooperative complementary movement of said tipple and guide plates in order to deposit articles onto a selected one of said conveying means.

2. A twin buffer-to-belt transfer device comprising a multiplicity of electrically released gravity operated dispensers, an electrically timed, operated and controlled buffer comprising a symmetrical, double-faced, rotating longitudinal tipple plate associated with a synchronized complementary oscillating guide plate pivoted about a longitudinal axis, twin longitudinal conveying belts positioned one on each side of said guide plate, and means including a transfer control circuit for controlling the rotation of said tipple plate and the oscillation of said guide plate, said last-named means being effective to oscillate said guide plate ninety degrees as said tipple plate rotates one-hundred eighty degrees, said belts being positioned parallel to the axis of said tipple plate and the pivot axis of said guide plate.

3. A twin buffer to belt transfer device comprising a multiplicity of dispensers, stationary longitudinal buffers, movable longitudinal buffers, oscillating complementary longitudinal guide plate, a transfer control circuit, and twin conveyor belts, said dispensers being electrically controlled, said buffers and guide plate being synchronized to operate and discharge alternately onto said belts, said guide plate oscillating 90 degrees as said buffer rotates 180 degrees, said circuit controlling said oscillation and said rotation.

4. A twin buffer to belt transfer device comprising a multiplicity of dispensers, said dispensers releasing articles by remote control, an electrically operated longitudinal buffer comprising a symmetrical double faced rotating trap and a synchronized complementary oscillating guide plate, a transfer control circuit and twin conveyor belts, said buffer being positioned above and parallel to said belts, said dispensers being positioned above said buffer, said guide plate oscillating 90 degrees as said trap rotates 180 degrees, said circuit controlling said oscillation and said rotation.

5. A twin buffer to belt transfer device comprising a multiplicity of dispensers, a transfer control circuit, an electrically timed, operated and controlled buffer comprising a two-fold symmetrical 180 degree buffer rotating 180 degrees in one direction around a longitudinal axis through its center and a synchronized longitudinal oscillating guide plate rotating 90 degrees in the opposite direction and twin longitudinal conveying belts, said circuit controlling said oscillation and said rotation.

6. A twin buffer to belt transfer device comprising a multiplicity of dispensers, a transfer control circuit, an electrically timed, operated and controlled longitudinal buffer comprising a two-fold symmetrical 180 degree buffer rotating 180 degrees in one direction around a longitudinal axis through its center and a synchronized longitudinal oscillating guide plate rotating 90 degrees in the opposite direction and twin longitudinal conveying belts, said belts being positioned one on each side of said buffer, said circuit controlling said oscillation and said rotation.

7. A twin buffer to belt transfer device comprising a multiplicity of electrically released gravity operated dispensers, a transfer control circuit, an electrically timed, operated and controlled longitudinal buffer comprising a symmetrical double faced rotating tipple plate mechanically associated with a synchronized complementary oscillating guide plate hinged along its lower edge and twin longitudinal belts positioned one on each side of said guide plate, said belts being positioned parallel to the axis of said tipple plate and the hinged edge of said guide plate, the motion of said guide plate being so timed by said electrical control circuit that it will complete its swing of 90 degrees at the same instant that the tipple plate comes to rest in its horizontal position.

8. A twin buffer to belt transfer device comprising a multiplicity of electrically released gravity operated dispensers, a transfer control circuit, an electrically timed, operated and controlled longitudinal buffer device consisting of a symmetrical double faced rotating tipple plate associated with a synchronized complementary oscillating guide plate hinged along its lower edge and twin longitudinal belts positioned one on each side of said guide plate, said belts being positioned parallel to the axis of said tipple plate and the hinged edge of said guide plate, and mechanical means for rotating said tipple plate 180 degrees in one direction and said guide plate 90 degrees in the opposite direction during the last 45 degrees of rotation of said tipple plate, said control circuit controlling said oscillation and said rotation.

9. A system for collecting and conveying dispensed articles comprising movably mounted means for receiving the articles, said movably mounted means having first and second article receiving positions, means for rotating the receiving means from one of said receiving positions to another, means for stopping the rotating means when the receiving means is in either of said receiving positions, and means including structure driven from said rotating means for operating said stopping means to maintain the receiving means in either of said receiving positions while collecting said dispensed articles.

10. A system for collecting and conveying dispensed articles comprising movable means for receiving the dispensed articles, said means having two article receiving positions, a pair of conveying means for receiving articles discharged from the receiving means, means for moving the article receiving means into either of the receiving positions, said movement to an article receiving position discharging the received articles onto one of said conveying means, structure driven by the means for moving the article receiving means, and means controlled in accordance with the position of said structure for stopping said moving means when the receiving means moves into one of its article receiving positions while collecting the dispensed articles.

11. An article transfer apparatus comprising a plurality of article dispensing means, an article receiving means pivoted about a centrally disposed axis and positioned below said dispensing means for collecting dispensed articles, guide means pivoted for movement about an axis passing therethrough, a pair of conveying means located at opposite sides of the axis of said guide means and extending parallel thereto, and transfer control means for causing said guide means to rotate through substantially ninety degrees during one-hundred eighty degree rotation of said article receiving means, thereby to discharge articles collected by said receiving means onto a selected one of said conveying means.

12. A system for collecting and conveying dispensed articles comprising rotatable means having two portions for receiving the dispensed articles, each of said portions also having an article discharging position, a pair of conveying means, each of said conveying means receiving the articles discharged from one of the pair of articles receiving portions, means for moving the receiving means to move one of the portions into an article receiving position and to move the other portion into an article discharging position, guide means controlled by the movement of the receiving means for directing the discharged articles onto a selected one of the conveying means, and means actuated by the guide means for stopping the receiving means in an article receiving position.

13. An apparatus for assembling and conveying articles comprising rotatable means for receiving the articles, said means having two article receiving portions, a pair of conveying means for transporting the articles collected by the receiving means, means for rotating the receiving means to discharge the articles collected on one portion thereof, guide means controlled by the rotation of the receiving means for directing the article discharged therefrom onto a selected one of the conveying means, and means responsive to movement of the other of the portions of the receiving means into an article receiving position for stopping the rotation of the receiving means.

14. A system for collecting and conveying articles comprising movably mounted means for receiving and discharging the articles, said movably mounted means having a plurality of article receiving positions, driving means for moving the receiving means to said receiving positions, means for stopping the receiving and discharging positions, means in each of said article receiving positions, and means operated by movement of the receiving and discharging means into each of said article receiving positions for actuating said stopping means to maintain the receiving and discharging means in a receiving position while it collects said articles.

15. An article transferring apparatus comprising a plurality of article dispensing means, a movable, longitudinally extending buffer for receiving said dispensed articles, a pair of conveying means positioned below and extending parallel to said buffer, a longitudinally extending guide plate alternately movable into different positions for sequentially directing articles discharged from said buffer to a selected one of said conveying means, and transfer control means moving said guide plate from one of its alternate positions to another in synchronism with movement of said buffer through one-hundred eighty degrees in order alternately to deposit said dispensed articles onto different ones of said conveying means.

16. An article transferring apparatus comprising article dispensing means, article receiving means mounted for rotation about an axis passing therethrough to a horizontal position for collecting dispensed articles, guide means pivoted for movement about a longitudinal axis and positioned below said article receiving means, means mechanically interconnecting said article receiving means and said guide means to effect synchronous movement thereof, a plurality of conveying means positioned on opposite sides of said guide means and extending parallel to the axis of rotation of said article receiving means and to the axis of said guide means, and transfer control means controlling said interconnecting means for moving said guide means to the end of substantially ninety degrees of rotation at the same instant that the article receiving means is moved into a horizontal position.

17. An apparatus for assembling and conveying articles comprising movably mounted means for receiving the articles, said means having a plurality of article receiving portions movable into article receiving positions, conveying means for transporting the articles collected by the receiving means, driving means for sequentially moving each article receiving portion of the receiving means to an article discharging position, movable guide means operated in timed relationship with the movement of the receiving means for movement to a plurality of different article directing positions in order to direct the articles discharged from the receiving means onto the conveying means, means for stopping the receiving means in each of its article receiving positions, and means operated when said guide means is moved to each of said article directing positions for operating said stopping means in order to hold the receiving means in an article receiving position while collecting articles.

18. An apparatus for assembling and conveying articles comprising movably mounted means for receiving the articles, said means having a plurality of article receiving portions movable into article receiving positions, a plurality of conveying means for transporting the articles collected by the receiving means, motor means for moving each article receiving portion of the receiving means to an article discharging position, guide means operated by said motor means to a plurality of different article directing positions in timed relationship with the movement of the receiving means in order to direct the discharged articles onto a selected one of said conveying means, the articles discharged from each of said receiving portions being directed by said guide means to a predetermined one of the conveying means, and switch means operated by movement of the guide means to each of its article directing positions for stopping said motor means in order to hold said guide means in an article directing position and at the same time to hold said receiving means in an article receiving position while collecting articles.

19. An apparatus for assembling and conveying articles comprising article dispensing means, a rotatable buffer for receiving dispensed articles from said dispensing means, a plurality of conveying means positioned below said rotatable buffer, said buffer comprising a rotatable tipple plate and a complementary oscillating guide plate positioned between the tipple plate and the conveying means, means for moving said tipple plate to a plurality of article receiving positions in order to collect articles dispensed from said dispensing means, means mechanically connecting said guide plate and said drive means for effecting the synchronous movement of the guide plate and the tipple plate, said oscillating guide plate being movable to alternate positions to guide articles onto a different one of said conveying means, and transfer control means for controlling said driving means in order to move said tipple plate from one article receiving position to another while at the same time moving said guide plate from one of its article directing positions to the other.

20. An apparatus for assembling and conveying material comprising movably mounted means for receiving and discharging the material, said means including a plurality of material receiving portions movable into material receiving positions, conveying means for transporting the material collected by the receiving and discharging means, driving means for successively moving said receiving portions into a material discharging position, switch means positioned adjacent the path of movement of said material receiving and discharging means to be operated thereby when said portions of the receiving and discharging means are moved to material receiving positions, and means controlled by said switch means for rendering the driving means ineffective whenever one of said receiving portions is in a material receiving position.

21. A transfer device comprising a multiplicity of dispensers, a transfer control circuit, an electrically timed, operated and controlled longitudinal buffer device consisting of a two-fold symmetrical 180 degree buffer rotating 180 degrees in one direction around a longitudinal axis through its center and a synchronized complementary oscillating guide plate rotating 90 degrees in the opposite direction and twin longitudinal conveying belts, said circuit controlling said oscillation and said rotation.

References Cited in the file of this patent

UNITED STATES PATENTS

| | | |
|---|---|---|
| 421,875 | Struble | Feb. 18, 1890 |
| 1,605,700 | Branaman | Nov. 2, 1926 |
| 1,981,783 | De Bussey | Nov. 20, 1934 |
| 2,374,537 | Goldsmith | Apr. 24, 1945 |
| 2,413,767 | Hyde | Jan. 7, 1947 |